US007658065B2

(12) United States Patent
Smith et al.

(10) Patent No.: US 7,658,065 B2
(45) Date of Patent: Feb. 9, 2010

(54) HYDRAULIC SYSTEM HAVING IN-SUMP ENERGY RECOVERY DEVICE

(75) Inventors: David P. Smith, Reddick, IL (US); Igor Strashny, Grenoble (FR); Daniel T. Mather, Lockport, IL (US)

(73) Assignee: Caterpillar Inc., Peoria, IL (US)

( * ) Notice: Subject to any disclaimer, the term of this patent is extended or adjusted under 35 U.S.C. 154(b) by 407 days.

(21) Appl. No.: 11/341,629

(22) Filed: Jan. 30, 2006

(65) Prior Publication Data

US 2007/0175209 A1 Aug. 2, 2007

(51) Int. Cl.
*F16D 31/02* (2006.01)

(52) U.S. Cl. ........................................ 60/414; 60/453

(58) Field of Classification Search .................. 60/413, 60/414, 453; 417/405, 406, 407
See application file for complete search history.

(56) References Cited

U.S. PATENT DOCUMENTS 4,278,928 A * 7/1981 Griffiths et al. ............... 475/75
4,693,080 A * 9/1987 Van Hooff .................. 60/414
5,049,045 A * 9/1991 Oklejas et al. ............. 417/406
5,179,836 A * 1/1993 Dantlgraber ................ 60/414
5,794,441 A * 8/1998 Lisniansky .................. 60/414
5,794,442 A * 8/1998 Lisniansky .................. 60/414
6,345,961 B1 * 2/2002 Oklejas, Jr. ................ 417/407
6,378,301 B2 * 4/2002 Endo et al. .................... 60/414
6,460,332 B1 * 10/2002 Maruta et al. ................ 60/414
6,480,781 B1 11/2002 Hafner et al.
6,748,738 B2 6/2004 Smith
6,935,114 B2 8/2005 Hajek et al.

* cited by examiner

*Primary Examiner*—Michael Leslie
(74) *Attorney, Agent, or Firm*—Finnegan, Henderson, Farabow, Garrett & Dunner

(57) ABSTRACT

A hydraulic energy recovery device for a hydraulic system is disclosed. The hydraulic energy recovery device has a first impeller configured to receive a flow of pressurized liquid, and a second impeller configured to pressurize a flow of liquid. The hydraulic energy recovery device also has a common shaft connecting the first and second impellers.

17 Claims, 2 Drawing Sheets

HYDRAULIC SYSTEM HAVING IN-SUMP ENERGY RECOVERY DEVICE

TECHNICAL FIELD

The present disclosure relates generally to a hydraulic system, and more particularly, to a hydraulic system having an energy recovery device locatable within a low pressure sump.

BACKGROUND

Work machines such as, for example, dozers, loaders, excavators, motor graders, and other types of heavy machinery use one or more hydraulic actuators to accomplish a variety of tasks. These actuators are fluidly connected to a pump on the work machine that provides pressurized liquid to chambers within the actuators. As the pressurized liquid moves into or through the chambers, the pressure of the liquid acts on hydraulic surfaces of the chambers to effect movement of the actuator. When the pressurized liquid is drained from the chambers it is returned to a low pressure sump on the work machine.

One problem associated with this type of hydraulic arrangement involves efficiency. In particular, the liquid draining from the actuator chambers to the sump has a pressure greater than the pressure of the fluid already within the sump. As a result, the higher pressure fluid draining into the sump still contains some energy that is wasted upon entering the low pressure sump. This wasted energy reduces the efficiency of the associated hydraulic system.

One method of improving the efficiency of such a hydraulic system is described in U.S. Pat. No. 6,480,781 (the '781 patent) issued to Hafner et al. on Nov. 12, 2002. The '781 patent describes a fuel system having a plurality of fuel injectors that are hydraulically actuated by way of high pressure engine oil. The fuel system includes a means for recovering hydraulic energy from oil leaving each of the fuel injectors. The means for recovering hydraulic energy includes a waste accumulating fluid control valve for each injector, and a hydraulic motor connected between a high pressure pump and the waste accumulating fluid control valves. As the actuating oil exits each fuel injector, it enters and drives the motor before being divided into two separate flows. A first of the two flows is directed to the high pressure pump, while the second is returned to an actuation fluid sump.

Although the means for recovering hydraulic energy described in the '781 patent may improve efficiency of the associated fuel system by driving the motor and associated pump with waste oil, it may be limited and problematic. In particular, because the means for recovering does not provide a way to store recovered energy, it may still be wasted if the demand for recovered energy is not immediate. In addition, because the pressure of the fluid exiting the fuel injectors may fluctuate significantly depending on injector operation, and because the means for recovering is directly associated with the high pressure pump, operation of the high pressure pump may also fluctuate significantly. This fluctuation of the high pressure pump could affect injector variability causing engine instability. Further, because oil from the motor may be diverted directly to the high pressure pump, air entrained within the oil may remain in the oil, causing sponginess in the hydraulic circuit.

The disclosed hydraulic system is directed to overcoming one or more of the problems set forth above.

SUMMARY OF THE INVENTION

In one aspect, the present disclosure is directed to a hydraulic energy recovery device. The hydraulic energy recovery device includes a first impeller configured to receive a flow of pressurized liquid, and a second impeller configured to pressurize a flow of liquid. The hydraulic energy recovery device also includes a common shaft connecting the first and second impellers.

In another aspect, the present disclosure is directed to a hydraulic system. The hydraulic system includes a low pressure sump configured to hold a supply of liquid, a hydraulic actuator, and a primary pump in fluid communication with the low pressure sump and the hydraulic actuator. The primary pump is configured to draw liquid from the low pressure sump, pressurize the liquid, and direct the pressurized liquid to the hydraulic actuator. The hydraulic system also includes an energy recovery device disposed downstream of the hydraulic actuator. The energy recovery device has a motor configured to receive a flow of waste liquid from the hydraulic actuator, and a transfer pump in communication with the low pressure sump and operatively driven by the motor.

In yet another aspect, the present disclosure is directed to a method of recovering energy from a hydraulic circuit. The method includes pressurizing a liquid to a first predetermined level and directing the pressurized liquid to a hydraulic actuator. The method also includes draining liquid from the hydraulic actuator, and using the draining liquid to pressurize a liquid to a second predetermined level.

DETAILED DESCRIPTION

Figure 1:
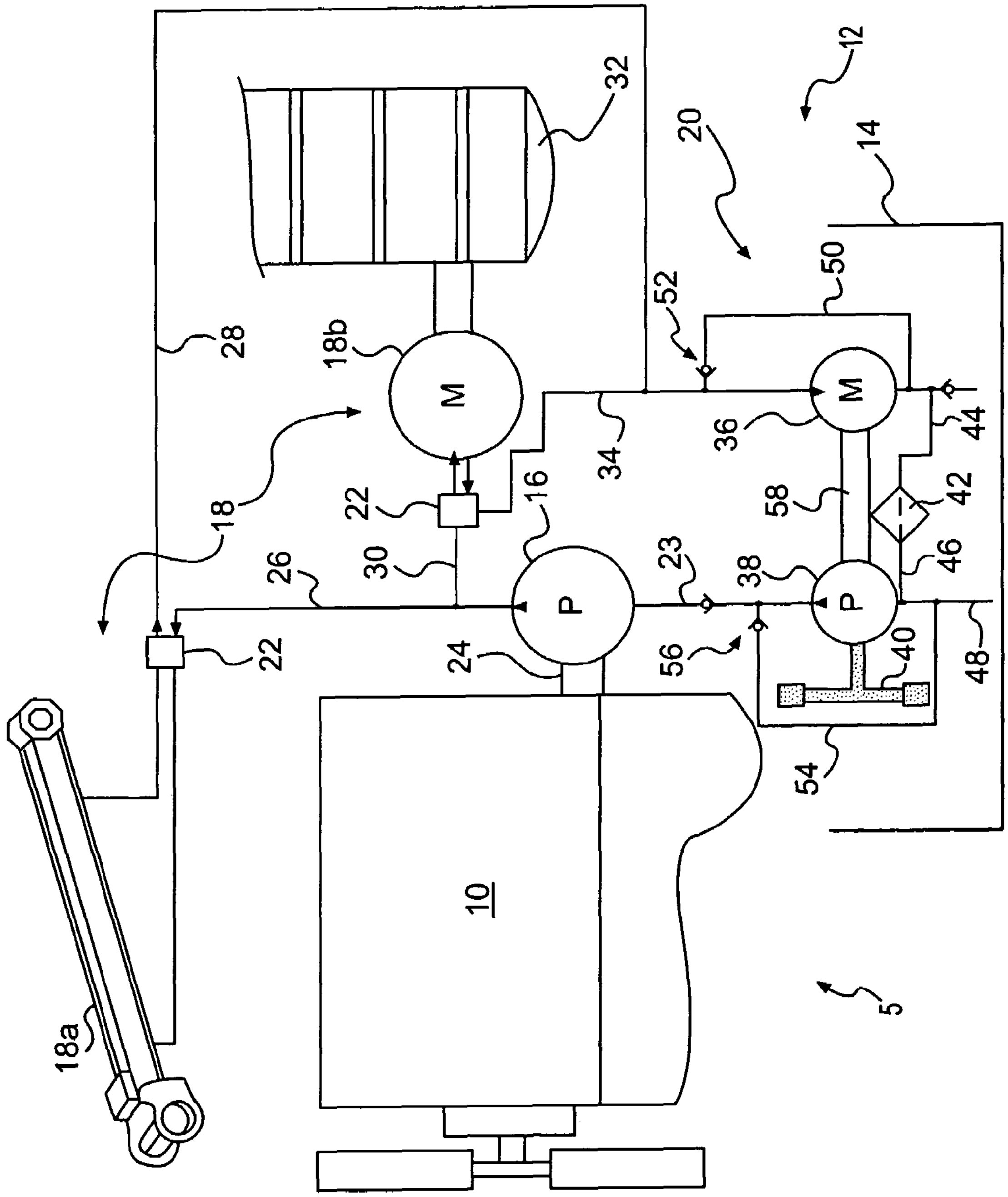
FIG. 1 is a schematic illustration of an exemplary disclosed hydraulic circuit.

FIG. 1 illustrates a power system 5 having a power source 10 drivingly associated with an exemplary disclosed hydraulic system 12. Power system 5 may generate a power output as part of a work machine that performs some type of operation associated with an industry such as mining, construction, farming, transportation, power generation, or any other industry known in the art. For example, power system 5 may embody the primary mover for a mobile machine such as an excavator, an on or off-highway haul truck, a backhoe, an excavator, a bus, a marine vessel, or any other mobile machine known in the art. Alternatively, power system 5 may embody the primary power source in a stationary machine such as a generator set, a pump, or any other stationary machine known in the art.

Power source 10 may embody an engine such as, for example, a diesel engine, a gasoline engine, a gaseous fuel-powered engine such as a natural gas engine, or any other engine apparent to one skilled in the art. Power source 10 may also include other sources of power such as a fuel cell, a power storage device, or any other source of power known in the art.

Hydraulic system 12 may include a plurality of components that cooperate together with power source 10 to perform a task. Specifically, hydraulic system 12 may include a low pressure sump 14, a primary source 16 of pressurized liquid, one or more actuators 18, and an energy recovery device 20. Low pressure sump 14, primary source 16, actuators 18, and energy recovery device 20 may form a circuit that assists in moving a work tool or propelling a work machine to accomplish the task. Hydraulic system 12 may also include one or more valve mechanisms 22 associated with each actuator 18 to control the operation thereof. It is contemplated that hydraulic system 12 may include additional and/or different components such as, for example, pressure compensators, accumulators, restrictive orifices, pressure relief valves, makeup valves, pressure-balancing passageways, temperature sensors, position sensors, controllers, and other such components known in the art.

Low pressure sump 14 may constitute a reservoir configured to hold a supply of liquid. The liquid may include, for example, a dedicated hydraulic oil, an engine lubrication oil, a transmission lubrication oil, or any other liquid known in the art. One or more hydraulic systems within power system 5 may draw liquid from and return liquid to low pressure sump 14. It is also contemplated that hydraulic system 12 may be connected to multiple separate sumps, if desired.

Primary source 16 may be a variable displacement pump, a variable delivery pump, a fixed displacement pump, or any other type of pump known in the art. For example, primary source 16 may embody a rotary or piston driven pump that is directly connected to power source 10 via an input shaft 24 such that an output rotation of power source 10 results in a corresponding pumping motion of primary source 16 that draws liquid from low pressure sump 14 via a suction line 23. Alternatively, primary source 16 may be connected to power source 10 via a torque converter, a gear box, or in any other manner known in the art. Primary source 16 may be dedicated to supplying pressurized liquid only to actuators 18, or alternatively may supply pressurized liquid to other hydraulic systems (not shown) within power system 5. It is also contemplated that primary source 16 may be driven by pressurized liquid to rotate and thereby start or otherwise assist power source 10, if desired.

Hydraulic actuators 18 may include, for example, a power cylinder 18*a* and/or a motor 18*b* that receive pressurized liquid from prime source 16. Hydraulic actuators 18 may operatively connect a work tool or traction device 32 to a frame of power system 5 via a direct pivot, via a linkage system, via a transmission unit, or in any other appropriate manner. It is contemplated that a hydraulic actuator 18 other than a power cylinder or motor may alternatively be implemented within hydraulic system 12, if desired.

Power cylinder 18*a* may include a tube, and a piston assembly disposed within the tube. One of the tube and piston assembly may be pivotally connected to the frame of power system 5, while the other of the tube and piston assembly may be pivotally connected to the work tool. Power cylinder 18*a* may include a first chamber and a second chamber separated by the piston assembly. The first and second chambers may be selectively supplied with pressurized liquid from primary source 16 and connected with low pressure sump 14 via supply and drain passageways 26 and 28, respectively, to cause the piston assembly to displace within the tube. The displacement of the piston assembly may change the effective length of power cylinder 18*a*, thereby assisting the movement of the work tool.

Motor 18*b* may include a rotary or piston type hydraulic motor movable by an imbalance of pressure. For example, liquid pressurized by primary source 16 may be directed to motor 18*b* via valve mechanism 22 and supply passageway 30. In response to an input requesting movement of the associated traction device 32 in either a forward or reverse direction, valve mechanism 22 may move to one of two flow passing positions to direct pressurized liquid to hydraulic motor 18*b*. Simultaneously, a drain passageway 34 may be fluidly communicated with motor 18*b* to direct liquid that has passed through motor 18*b* to low pressure sump 14. The direction of pressurized fluid to one side of motor 18*b* and the draining of fluid from an opposing side of motor 18*b* may create a pressure differential that causes the motor 18*b* to rotate. The direction and rate of liquid flow through motor 18*b* may determine the rotational direction and speed of traction device 32, while the pressure of the liquid may determine the torque output.

Energy recovery device 20 may include multiple components fluidly interconnected to recover energy from and condition liquid draining from actuators 18 to low pressure sump 14. Specifically, energy recovery device 20 may include a driving element 36, a driven element 38, a means for storing energy 40, and a means for conditioning liquid 42. Driving element 36 may be connected to receive waste liquid from actuators 18 via drain passageways 28 and 34, and to direct the liquid to driven element 38 via the means for conditioning liquid 42 and fluid passageways 44 and 46. Driven element 38 may receive the waste liquid from driving element 36 and draw additional liquid from low pressure sump 14 by way of a suction line 48. A first bypass circuit 50 having a check valve 52 may regulate the pressure and/or rate of the waste liquid flowing through driving element 36, while a second bypass circuit 54 having a check valve 56 may regulate the pressure and/or rate of the liquid flowing through driven element 38. Driving element 36 may be connected to drive each of driven element 38, the means for storing energy 40, and the means for conditioning liquid 42 by way of, for example, a common shaft 58, a gear train (not shown), a cam mechanism (not shown), a linkage system (not shown), or in any other appropriate manner such that a rotation of driving element 36 results in an actuating motion of the connected components. It is contemplated that any one or all of the components of energy recovery device 20 may be located within or in close proximity to low pressure sump 14, if desired. It is further contemplated that the means for conditioning liquid could alternatively be located upstream of driving element 36 or downstream of driven element 38, if desired.

Figure 2A:
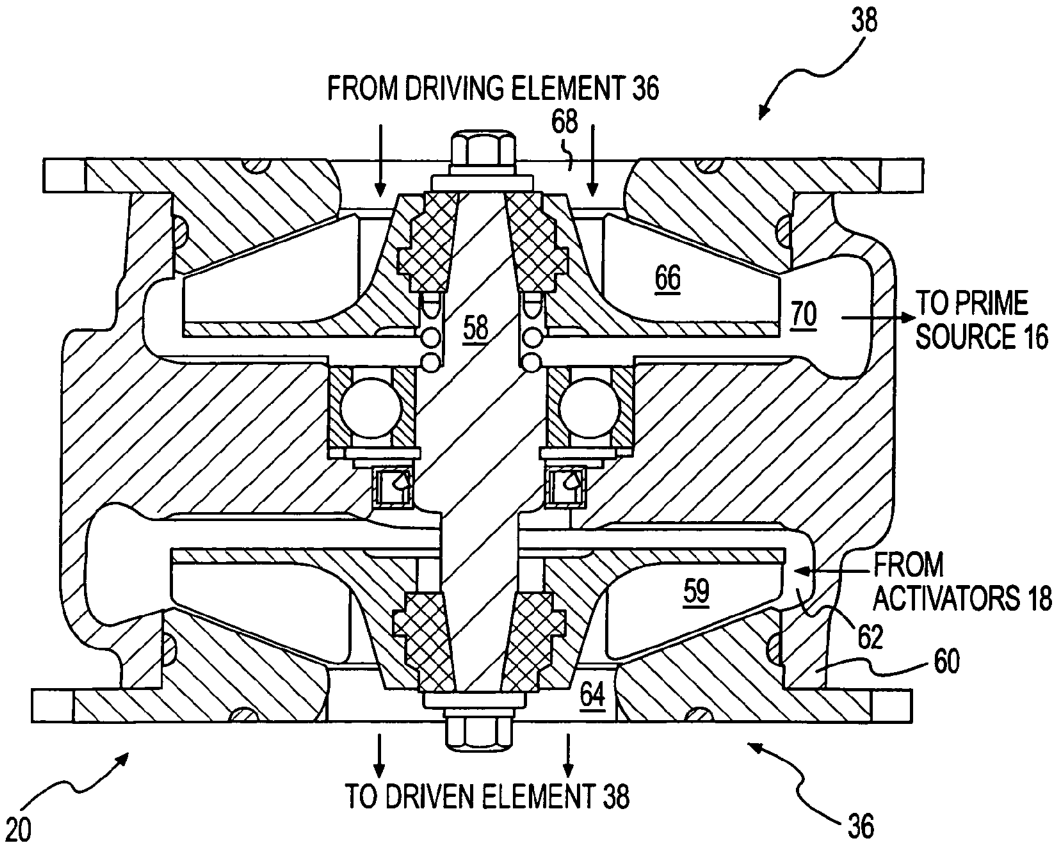
FIG. 2A is a cross-section illustration of an energy recovery device used in the hydraulic circuit of FIG. 1.

As illustrated in FIG. 2A, driving element 36 may embody a rotary type hydraulic motor configured to mechanically drive the other components of energy recovery device 20 in response to a flow rate and pressure of waste liquid from actuators 18. In particular, driving element 36 may include an impeller 59 disposed within a volute housing 60 having an inlet 62 and an outlet 64. As pressurized liquid enters volute housing 60, the pressure of the liquid may act against blades of impeller 59 urging impeller 59 and connected common shaft 58 to rotate. A pressure of the liquid may determine an output torque of driving element 36, while a flow rate may determine a rotational speed. It is contemplated that driving element 36 may embody a conventional type of hydraulic motor, if desired.

Figure 2B:
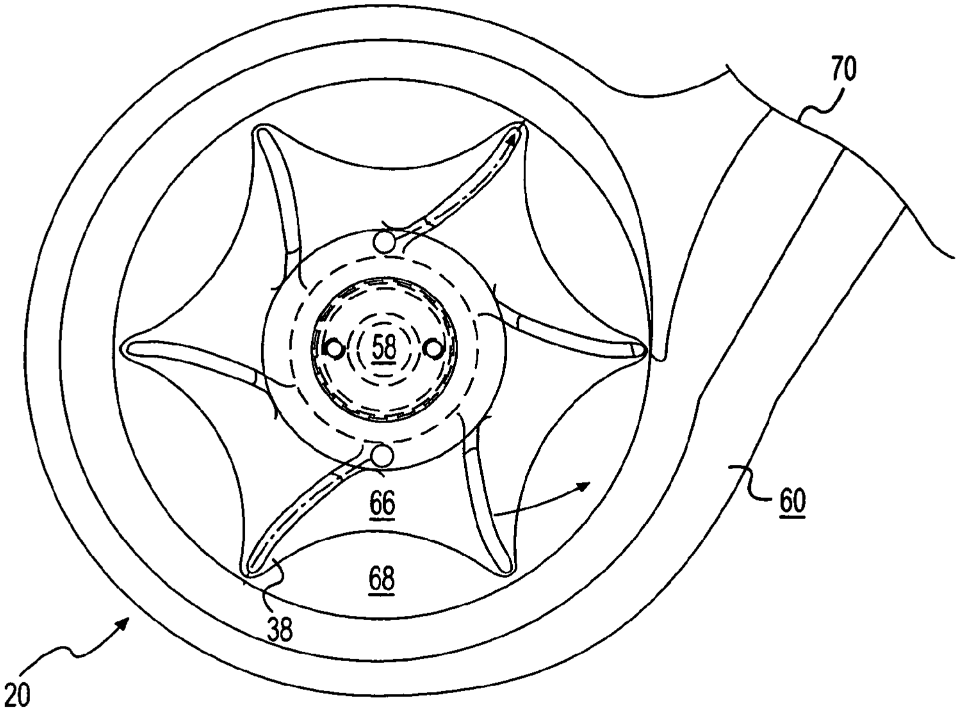
FIG. 2B is a side-view diagrammatic illustration of the energy recovery device of FIG. 2A.

FIGS. 2A and 2B illustrate driven element 38 as a rotary type hydraulic transfer pump driven by common shaft 58 to pressurize fluid from driving element 36 and low pressure sump 14. Specifically, driven element 38 may include an impeller 66 disposed within volute housing 60. Liquid from driving element 36 and low pressure sump 14 may flow through driven element 38 by way of an inlet 68 and an outlet 70. As liquid flows through inlet 68 to impeller 66, the blades of impeller 66 may rotate to pressurize the liquid. The pressure of the liquid exiting driven element 38 may be less than the pressure of the liquid exiting primary source 16. A torque of impeller 66 may determine a pressure of the liquid leaving driven element 38, while a speed of impeller 66 may determine a flow rate. It is contemplated that driven element 38 may embody a conventional type of hydraulic pump, if desired The means for storing energy 40 may function to remove excess energy from the waste liquid for later use by hydraulic system 12. For example, the means for storing energy 40 could embody a flywheel device configured to store excess energy kinetically, an accumulating device, or any other means known in the art. The flywheel device may be any type of device for storing and releasing rotational energy recovered by driving element 36. For example, the flywheel may embody a fixed inertia flywheel, a variable inertia flywheel, an electric flywheel (e.g., an electric power generating device such as a motor/generator), or any other type of flywheel known in the art. The accumulating device may embody a hydraulic accumulator configured to store and release pressurized fluid, or an electrical accumulator such as a battery or capacity associated with an electric flywheel and configured to store and release electrical power. It is contemplated that the means for storing energy 40 may be connected to common shaft 58 at any suitable location along its length such as, for example, between driving and driven elements 36 and 38, or toward one end of common shaft 58. It is further contemplated that a clutch device may be associated with means 40 to selectively engage and disengage means 40 with common shaft 58, if desired. It is also contemplated that the means for storing energy 40 may be omitted, if desired.

The means for conditioning liquid 42 may function to remove unwanted elements from the liquid before the liquid is directed to primary source 16. For example, the means for conditioning liquid 42 could embody a water/air separator, a centrifugal debris filter, a combination of both a water/air separator and a debris filter, or other similar means. The means for conditioning liquid 42 may be rotary driven and operatively connected to common shaft 58 such that an input rotation of driving element 36 results in the separating/filtering action of means 42. It is contemplated that the means for conditioning liquid 42 could be fluidly connected upstream of driving element 36, between driving element 36 and driven element 38, or downstream of driven element 38, if desired. It is also contemplated that the means for conditioning liquid 42 may be omitted, if desired.

INDUSTRIAL APPLICABILITY

The disclosed hydraulic system may be applicable to any work machine that includes a hydraulic actuator where efficiency, consistent performance, and aeration of the actuating liquid are issues. The disclosed hydraulic system may improve efficiency and performance consistency by providing an energy recovering device that is disposed upstream of a primary pressure source. The energy recovery device may aid in reducing aeration by baffling a return flow of waste liquid, providing rotary style driving and driven elements, and by providing a means for conditioning the liquid. The operation of hydraulic system 12 will now be explained.

Actuators 18 may be movable by pressurized liquid in response to an operator input. Specifically, as illustrated in FIG. 1, liquid may be pressurized by primary source 16 and directed to valve mechanisms 22 associated with power cylinder 18*a* and motor 18*b*. In response to an operator input to move a work tool (not shown) or traction device 32, valve mechanisms 22 may move to open positions, thereby directing pressurized liquid to specific chambers within power cylinder 18*a* or motor 18*b*. Simultaneously, valve mechanisms 22 may move to positions at which liquid from power cylinder 18*a* or motor 18*b* drains to low pressure sump 14, thereby creating a pressure differential that causes power cylinder 18*a* or motor 18*b* to actuate.

As the liquid drains from actuators 18, it may still be at a pressure level greater than the pressure of the liquid within low pressure sump 14. If the draining liquid were simply directed to join the lower pressure liquid within low pressure sump 14, the energy associated with the draining liquid would be lost. To improve efficiency of hydraulic system 12, the energy of the draining liquid may be recovered by directing the draining liquid to energy recovery device 20.

As the draining liquid flows into energy recovery device 20, it may first flow through and drive impeller 59 (referring to FIG. 2) of driving element 36. If the pressure of the draining fluid flowing through impeller 59 exceeds a predetermined pressure associated with check valve 52, the draining liquid may pass through check valve 52 and bypass driving element 36 by way of first bypass circuit 50. After imparting rotational energy to impeller 59 of driving element 36, some or all of the draining fluid may be directed to the means for conditioning liquid 42, and then on to driven element 38. It is contemplated that a portion of the draining liquid may be directed to join the lower pressure liquid already within low pressure sump 14 before or after flowing through the means for conditioning liquid 42, if desired. While flowing through the means for conditioning liquid, air and/or debris may be removed from the liquid.

As common shaft 58 is rotated by driving element 36, driven element 38 and the means for storing energy 40 may be actuated to pressurize liquid and store energy. In particular, as impeller 66 (referring to FIGS. 2A and 2B) of driven element 38 is rotated, the liquid from driving element 36 and low pressure sump 14 may be drawn into volute housing 60, pressurized, and directed to primary source 16 via suction line 23. During situations in which the recovered energy is not immediately demanded, the pressurized fluid may be recirculated from outlet 70 to inlet 68 by way of check valve 56 and second bypass circuit 54. In these situations, the energy may be stored for later use by the means for storing energy 40.

The energy stored by means 40 may be used in a number of different ways. For example, during high demand situations where primary source 16 is unable to efficiently provide the flow and/or pressure demands of actuators 18, the stored energy may be released by means 40 to supplement the supply of pressurized liquid. In another example, the stored energy may be used to drive primary source 16 and connected power source 10 to supplement the power output of power source 10 and/or to execute a starting operation of power source 10. It is also contemplated that the stored energy may be diverted from hydraulic system 12 to other hydraulic systems associated with power system 5 such as, for example, a braking system, a steering system, a ride control system, or other similar systems known in the art, if desired.

In addition to the improved efficiency associated with recovering energy from the waste liquid and the reduction in aeration associated with means 42, the disclosed system may also reduce the component cost of power system 5. Specifically, because of the additional available assistance provided by means 40, the capacity and associated size of some components of power system 5 (i.e., primary source 16, power source 10, starter, brake pump, steering pump, ride control pump, etc.) may be reduced. These reduced capacity requirements and sizes of the components of power system 5 may allow for smaller, low weight, and low cost components.

Hydraulic system 12 may provide for air removal from the pressurized liquid in addition to that afforded by means 42. In particular, the rotary motion of impellers 59 and 66 may allow for additional air removal through the use of one or more check valves (not shown) located near the axial center and/or the periphery of impellers 59 and 66. This additional air separation may not be available with non-rotary driving and driven elements.

Hydraulic system 12 may provide for consistent operation of power system 5. Specifically, because hydraulic system 12 can recover power from multiple hydraulic circuits and includes flow-regulating bypass circuits, the flow of liquid draining through driving element 36 and the resultant energy recovered by driven element 38 may be continuous and at a substantially constant level. Further, the reduced aeration levels within the recovered liquid may provide for a more responsive hydraulic system that furthers overall consistency. In addition, because the energy may be recoverable and storable upstream of primary source 16, the operation of primary source 16 may only be affected by the recovered energy when demand requires, which may further consistent operation of power system 5.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic energy recovery device, comprising:

a first impeller configured to receive a flow of pressurized liquid;

a second impeller configured to pressurize a flow of liquid;

a common shaft connecting the first and second impellers; and a separating mechanism operatively driven by the first impeller.

2. The hydraulic energy recovery device of claim 1, wherein the separating mechanism is rotatably driven to remove air from the pressurized liquid downstream of the first impeller.

3. The hydraulic energy recovery device of claim 1, further including a means for storing energy.

4. The hydraulic energy recovery device of claim 3, wherein the means for storing energy includes a flywheel operatively driven by the first impeller.

5. The hydraulic energy recovery device of claim 4, wherein the flywheel is an electric flywheel configured to store and release energy electrically.

6. A hydraulic system, comprising:

a low pressure sump configured to hold a supply of liquid;

a hydraulic actuator;

a primary pump in fluid communication with the low pressure sump and the hydraulic actuator, the primary pump configured to draw liquid from the low pressure sump, pressurize the liquid, and direct the pressurized liquid to the hydraulic actuator; and an energy recovery device disposed downstream of the hydraulic actuator, the energy recovery device including:

a motor configured to receive a flow of waste liquid from the hydraulic actuator;

a transfer pump in communication with the low pressure sump and operatively driven by the motor;

a first fluid passageway connecting an outlet of the motor with an inlet of the transfer pump;

a second fluid passageway connecting the low pressure sump with the inlet of the transfer pump; and a check valve disposed within the second fluid passageway.

7. The hydraulic system of claim 6, wherein the motor is disposed within the low pressure sump.

8. The hydraulic system of claim 6, wherein both the motor and the transfer pump include impellers.

9. The hydraulic system of claim 8, wherein the impellers of the motor and transfer pump are connected by way of a common shaft.

10. The hydraulic system of claim 6, wherein the transfer pump is fluidly connected to supply low pressure feed to the primary pump.

11. The hydraulic system of claim 6, further including a rotary air/liquid separator operatively driven by the motor.

12. The hydraulic system of claim 11, wherein the rotary air/liquid separator is configured to separate air from the liquid upstream of the transfer pump.

13. The hydraulic system of claim 6, further including a flywheel operatively driven by the motor.

14. A method of recovering energy from a hydraulic circuit, comprising:

pressurizing liquid to a first predetermined level;

directing the pressurized liquid to a hydraulic actuator;

draining liquid from the hydraulic actuator;

using the draining liquid to pressurize liquid to a second predetermined level; and separating air from the liquid pressurized to the second predetermined level.

15. The method of claim 14, wherein pressurizing liquid to a first predetermined level includes pressurizing liquid from the second predetermined level to the first predetermined level.

16. The method of claim 14, further including removing energy from the draining liquid and storing the removed energy.

17. The method of claim 16, wherein the energy is stored kinetically.

* * * * *